Aug. 23, 1949.  R. C. PIERCE  2,479,863
SNUBBER
Filed June 26, 1944
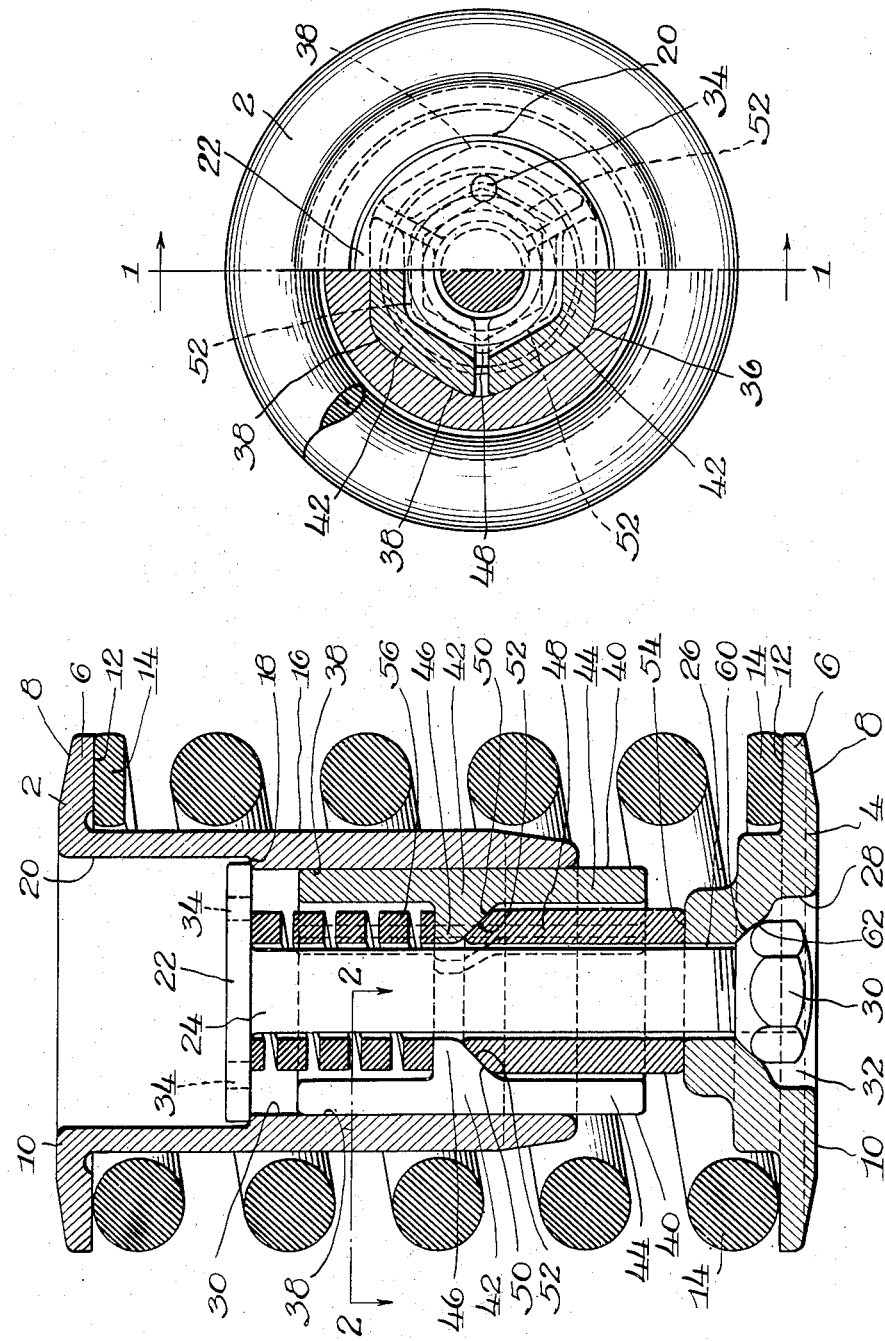
INVENTOR.
Raymond E. Pierce Patented Aug. 23, 1949

2,479,863

UNITED STATES PATENT OFFICE 2,479,863

SNUBBER

Raymond C. Pierce, Chicago, Ill.

Application June 26, 1944, Serial No. 542,083

5 Claims. (Cl. 267—9)

1

My invention relates to a friction absorbing device and more particularly to a form thereof adapted for use in a railway car truck.

The general object of my invention is to provide a novel form of friction absorbing device especially adapted for use as a snubber in combination with a group of truck springs of railway cars for dampening the vibrations of truck springs.

Another object of my invention is to provide a friction absorbing device including relatively movable friction elements actuated upon compression of the device between the bolster and the truck frame, and so designed as to insure proper engagement of the friction surfaces of the friction elements at all times, irrespective of normal lateral displacement of the bolster relative to the truck frame under varying track conditions.

A specific object of my invention is to provide a friction absorbing device wherein the compression spring may be associated with top and bottom followers, one of said followers having a friction surface cooperating with friction surfaces on relatively movable friction shoes, said shoes engaging a wedge member seated on the other follower and having a resilient member associated therewith for urging said shoes radially toward their associated follower, all of the component parts being connected together by an interlocking member having one end thereof in engagement with one of the followers and the other end thereof having spherical engagement with the other follower, said spherical engagement permitting lateral displacement of one follower with respect to the other follower without tilting or rocking the shoes on the friction surface of the associated follower or the occurrence of a bending stress on the device.

A more specific object of my invention is to provide a friction absorbing device such as that described, wherein stop means is provided by affording abutting means on the followers and the interlocking member in such manner as to limit the expansion of the device and to hold the respectve parts of the snubber in assembled relation.

In the drawings,

Figure 1 is a vertical sectional view taken on one diameter of my novel form of friction device and approximately in the plane indicated by the line 1—1 of Figure 2, a portion thereof being illustrated in elevation.

Figure 2 is a top plan view of the structure shown in Figure 1, half in section, the section

2 being taken approximately in the horizontal plane indicated by the line 2—2 of Figure 1.

Referring now in detail to the drawing, my novel friction absorbing device or snubber comprises top and bottom followers 2 and 4, each of said followers having a base 6 chamfered as at 8 to afford a rocking seat at 10 for each end of the device. Each base 6 may also have an annular horizontal flange affording a seat as at 12 for one end of the compression spring 14.

Projecting from one side of the flange of the top follower 2 and extending within the spring 14 is a tubular member or stem 16. The interior surface of the stem 16 is provided with the annular horizontal stop shoulder 18 and the portion of the stem above the shoulder is of cylindrical interior cross section, as clearly shown at 20 in Figure 2, for receiving the head 22 of the boltlike member 24, said head being preferably widened to seat upon the shoulder 18. The shaft of the bolt 24 extends downwardly of the shoulder 18 within the stem 16 and through an annular opening 26 in the bottom follower 4, the bottom follower having a hollow section 28 into which the threaded end of the bolt extends for engagement with a nut 30, said nut and the end of said bolt being received within the recess or cavity 32 formed by said hollow section. The head of the bolt has openings 34 therein for reception of a suitable tool for preventing rotation of the bolt upon threaded engagement of the nut with the end of the bolt.

The portion of the stem below said shoulder 18 is preferably of substantially hexagonal interior cross section, as shown at 36 in Figure 2, thereby providing three V-shaped interior longitudinally extending friction surfaces 38, slidably engaging the V-shaped friction surfaces 40 of three friction shoes 42.

The three friction shoes 42 are arranged about the bolt 24 and are of similar design. Each shoe comprises an elongated web portion 44 of V-shaped transverse cross section, so as to properly fit the corresponding friction surface 38 of the stem 16 and an intermediate ledge 46 extending inwardly toward the bolt 24 for engagement with a tubular wedge member 48 slidably mounted on the bolt 24.

The wedge member 48 and the shoes 42 are so related and constructed that the shoes are urged radially outward of the vertical axis of the device and in intimate frictional engagement with the V-shaped surfaces 38 of the stem 16 upon relative approach of the top and bottom followers. To this end, the ledge 46 of each shoe is provided with a lower diagonal V-shaped surface 50 for engaging a corresponding surface on the upper end of the member 48, said wedge member 48 having its upper end provided with three diagonal wedge surfaces 52, symmetrically arranged around the vertical axis of the device and converging toward the bolt 22 and engaging the V-shaped surface 50 of each shoe. The bottom of the wedge member is seated on the flat upper end face 54 of the bottom follower 4. The shoes 42 are held in engagement with the stem 16 and the wedge member 48 by a spring 56 surrounding the bolt 24, said spring having one end seated on the ledges 46 of the shoes and the other end seated against the bolt head 22.

It may be noted that the component parts of my novel friction absorbing device are so arranged that the bolt and nut assembly provides interlocking or retaining means for maintaining the parts in assembled relation and also stop means for limiting the expansion of the device. Thus, when the component parts of the device are in assembled relation, the spring is preferably under compression to thereby force the V-shaped surface 50 of the shoes into engagement with the corresponding surface 52 of the wedge member 48, the resultant spreading of the friction shoes urging the same radially outward of said bolt and into tight frictional engagement with the friction surface of the stem 16.

In the illustrated embodiment of the invention, the nut 30 is preferably formed with a spherical convex bearing surface 60 engaging a spherical concave bearing surface 62 of the section 26 of the bottom follower 4 for providing a ball and socket connection therebetween. The relationship of these surfaces permits the top follower 2 and the friction elements supported on the bolt to oscillate about the vertical axis of the device relative to the bottom follower 4, and accordingly, lateral displacement between the upper and lower surfaces of the snubber may be had without tilting or rocking the shoes on the friction surfaces of the stem 16, thereby maintaining at all times full face contact of the friction surfaces of the shoes and the stem 16 of the follower 2, sufficient clearance being provided between the bolt and wall of the opening in the bottom follower to allow such movement without creating stresses in the device.

In the operation of my novel snubber, upon relative approach of the top and bottom followers 2 and 4, the outer spring 14 will be compressed therebetween and movement of the parts will be additionally resisted by the action of the friction shoes on the friction surfaces of the stem 16. Upon return of the parts due to the expansion of the spring 36, relative movement between the top and bottom followers will also be resisted by the friction between the stem 16 and the shoes. Thus, the frictional resistance produced during such relative movement between the followers will effectively snub the oscillations of the truck springs with which the snubber is grouped.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a snubber, a follower comprising a friction barrel, friction shoes therein in frictional engagement therewith, rigid wedge means within said barrel in wedge engagement with said shoes, a retainer member extending between said shoes and comprising a spring abutment within said barrel, spring means reacting against said abutment and said shoes for urging the latter into said engagement with said barrel and said wedge means, another follower disposed externally of said barrel and having a universal joint connection to said member, said other follower having slidable engagement with said wedge means along surfaces approximately perpendicular to the longitudinal axis of said barrel, whereby relative lateral movement between said followers is accommodated by sliding movement between said wedge means and said other follower without affecting the engagement of said shoes with said wedge means and said barrel, and spring means reacting between said followers for resisting compression of said snubber.

2. In a snubber, a follower comprising a friction barrel with an internal friction surface terminating in a shoulder, friction shoes within said barrel in frictional engagement with said surface, rigid wedge means within said barrel in wedge engagement with said shoes, a retainer member extending between said shoes and comprising a spring abutment within said barrel, spring means reacting against said abutment and said shoes for urging the latter into said engagement with said surface and said wedge means, another follower disposed externally of said barrel and having a ball and socket connection to said member, said other follower having slidable engagement with said wedge means along surfaces approximately perpendicular to the longitudinal axis of said barrel, whereby relative lateral movement between said followers is accommodated by sliding movement between said wedge means and said other follower, and spring means reacting between said followers for resisting compression of said snubber, said spring abutment being engageable with said shoulder to limit expansion of said snubber.

3. In a snubber, a follower comprising a friction barrel, friction shoes therein in frictional engagement therewith, a wedge block within said barrel in wedge engagement with said shoes, a retainer member sleeved within an opening on said block, extending between said shoes, and comprising a spring abutment within said barrel, spring means reacting against said abutment and said shoes for urging the latter into said engagement with said barrel and said block, another follower disposed externally of said barrel and having a ball and socket connection to said member, said other follower having slidable engagement with said block externally of said barrel along surfaces approximately perpendicular to the longitudinal axis of said barrel, and spring means reacting between said followers for resisting compression of said snubber.

4. In a snubber, a follower comprising a friction barrel, friction shoes therein in frictional engagement therewith, rigid wedge means within said barrel in wedge engagement with said shoes, a retainer member extending between said shoes and comprising a spring abutment within said barrel, spring means compressed between and bearing directly against said abutment and said shoes for urging the latter into said engagement with said barrel and said wedge means, another follower having a ball and socket connection to said member and having slidable engagement with said wedge means along surfaces disposed externally of said barrel and approximately perpendicular to the longitudinal axis thereof, and spring means reacting between said followers for resisting compression of said snubber.

5. In a snubber, a follower comprising a friction barrel, friction shoes therein in frictional engagement therewith, rigid wedge means in wedge engagement with said shoes, a retainer member extending between said shoes and comprising a spring abutment within said barrel, spring means reacting between said abutment and said shoes for urging the latter into said engagement with said barrel and said wedge means, and another follower disposed externally of said barrel having a universal joint connection to said member and having slidable engagement with said wedge means along surfaces approximately perpendicular to the longitudinal axis of said barrel.

RAYMOND C. PIERCE.

REFERENCES CITED

The following references are of record in the file of this patent:

UNITED STATES PATENTS

| Number | Name | Date |
| --- | --- | --- |
| 1,586,250 | Lane | May 25, 1926 |
| 1,783,158 | Eckart | Nov. 25, 1930 |
| 1,923,894 | Sproul | Aug. 22, 1933 |
| 1,940,446 | Clark | Dec. 19, 1933 |
| 1,985,369 | Fuchs | Dec. 25, 1934 |
| 2,059,503 | Webb | Nov. 3, 1936 |
| 2,276,228 | Cottrell | Mar. 10, 1942 |
| 2,279,914 | Cottrell | Apr. 14, 1942 |